US007936710B2

(12) United States Patent
Gregorio Rodriguez et al.

(10) Patent No.: US 7,936,710 B2
(45) Date of Patent: May 3, 2011

(54) SYSTEM, APPARATUS AND METHOD FOR SIM-BASED AUTHENTICATION AND ENCRYPTION IN WIRELESS LOCAL AREA NETWORK ACCESS

(75) Inventors: Jesús Angel de Gregorio Rodriguez, Madrid (ES); Miguel Angel Monjas Llorente, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1166 days.

(21) Appl. No.: 10/510,498

(22) PCT Filed: May 1, 2002

(86) PCT No.: PCT/EP02/04865
§ 371 (c)(1),
(2), (4) Date: May 4, 2005

(87) PCT Pub. No.: WO03/094438
PCT Pub. Date: Nov. 13, 2003

(65) Prior Publication Data
US 2006/0052085 A1   Mar. 9, 2006

(51) Int. Cl.
*H04W 4/00* (2009.01)
(52) U.S. Cl. ........ 370/328; 370/442; 370/458; 370/459; 455/422.1; 455/460; 455/452.1; 709/237
(58) Field of Classification Search .................. 455/410, 455/422.1, 460, 452.1; 370/442, 458, 459; 709/237
See application file for complete search history.

(56) References Cited

U.S. PATENT DOCUMENTS

| | | | | |
|---|---|---|---|---|
| 6,854,014 B1 * | 2/2005 | Amin et al. | ................... | 709/227 |
| 7,043,633 B1 * | 5/2006 | Fink et al. | ..................... | 713/162 |
| 2002/0009199 A1 * | 1/2002 | Ala-Laurila et al. | .......... | 380/247 |
| 2002/0012433 A1 * | 1/2002 | Haverinen et al. | ............ | 380/247 |
| 2003/0120920 A1 * | 6/2003 | Svensson | ..................... | 713/168 |

FOREIGN PATENT DOCUMENTS

| | | |
|---|---|---|
| WO | 01/76297 | 10/2001 |
| WO | WO 01/76297 A1 | 10/2001 |

OTHER PUBLICATIONS

International Search Report for International Application No. PCT/EP02/04865 dated May 1, 2002.
International Search Report mailed Jan. 2, 2003 in corresponding PCT Application PCT/EP02/04865.
Reply to Written Opinion dated Feb. 11, 2004 in corresponding PCT Application PCT/EP02/04865.
IPER dated Aug. 13, 2004 in corresponding PCT Application PCT/EP02/04865.

* cited by examiner

*Primary Examiner* — Lester Kincaid
*Assistant Examiner* — Sayed T Zewari
(74) *Attorney, Agent, or Firm* — Nixon & Vanderhye P.C.

(57) ABSTRACT

The invention refers to a system, apparatus and method for carrying out a SIM-based authentication of a user accessing a WLAN, without having provided yet an IP connectivity, along with a layer-2 encryption mechanism for protecting the path between the Terminal Equipment and the Mobile network.
Therefore, the invention provides a method for establishing a PPP-tunneling for AKA dialogues between the terminal and an Access Controller for accessing the mobile network owning the SIM.
The invention also provides an Access Controller (AC) comprising a Point-to-Point over Ethernet (PPPoE) server for tunneling AKA dialogues from a PPP-client installed in the terminal for the same purpose, and also comprising a Traffic Router and a RADIUS-client. The AC thus including a RADIUS-client is interposed between a RADIUS-proxy accessed from the access points (AP) in the WLAN and the mobile network where SIM-based authentication is carried out.

24 Claims, 4 Drawing Sheets

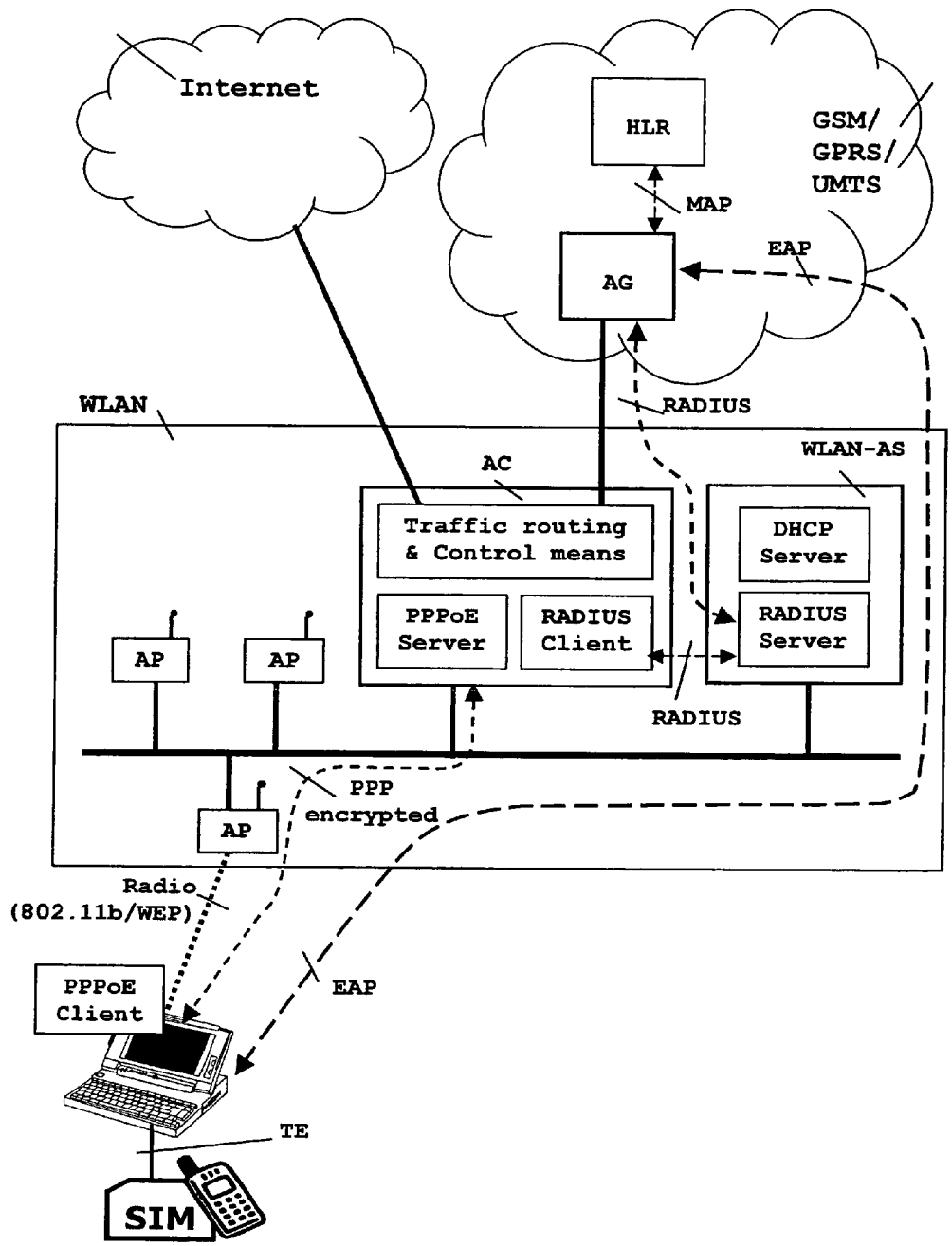
FIG.-1-

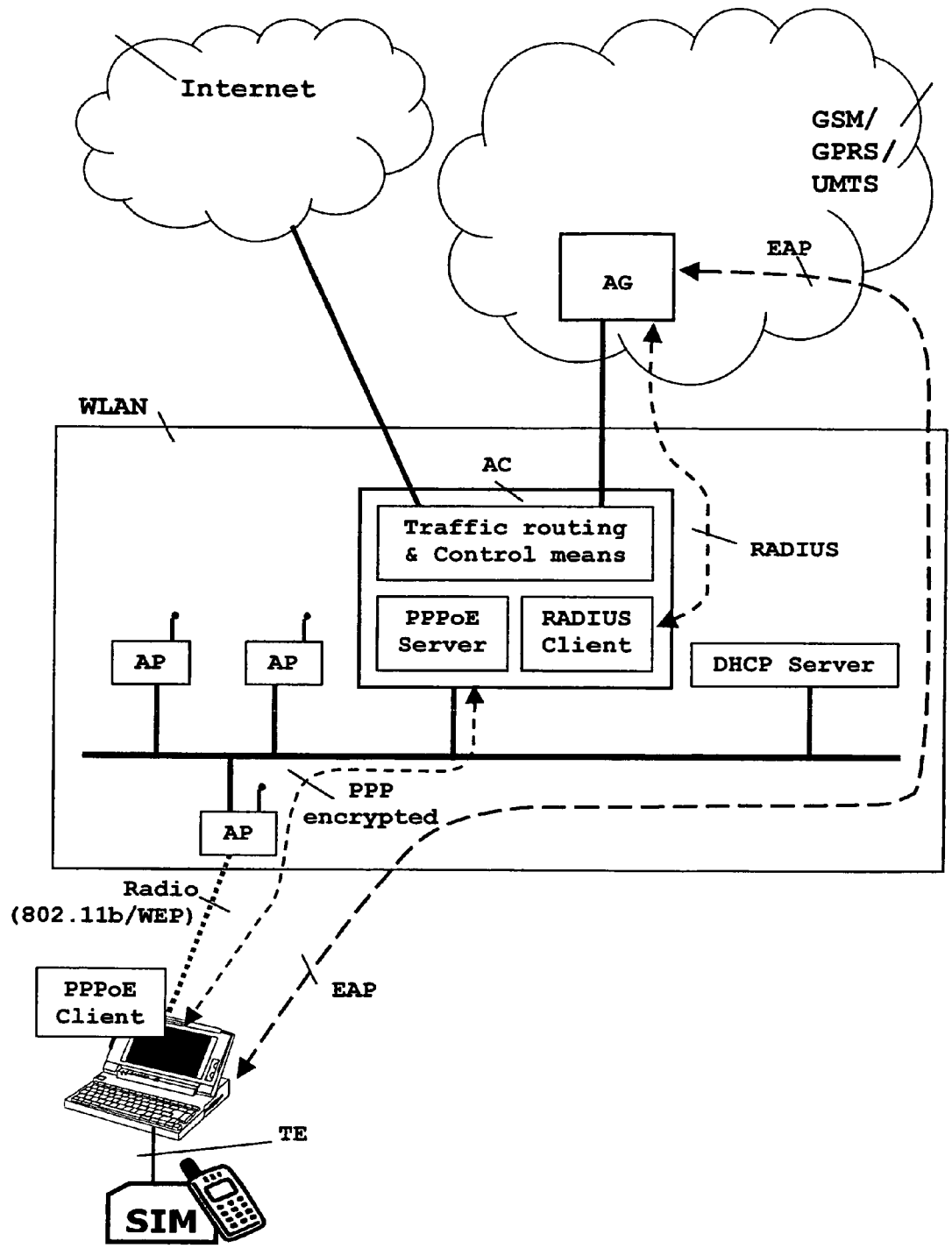
FIG.-2-

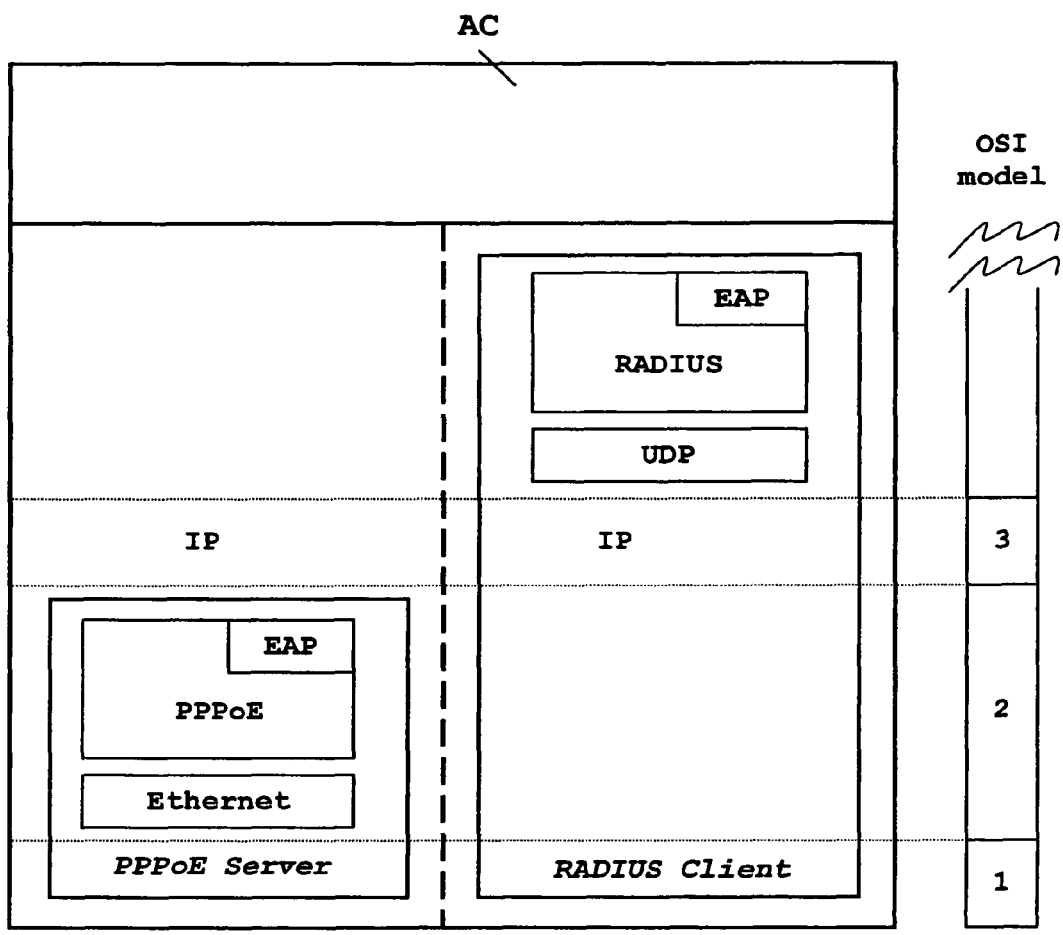
FIG.-3-

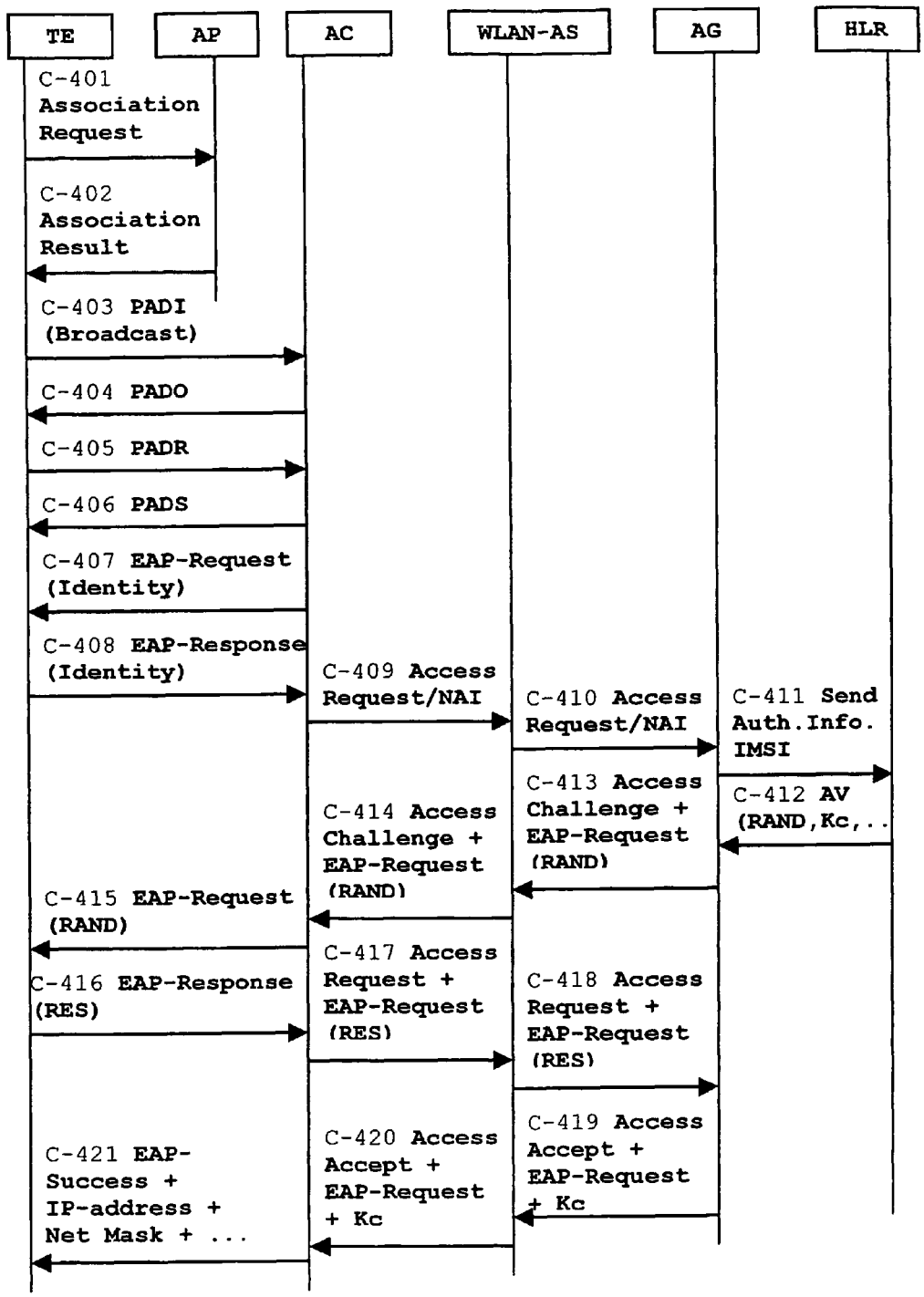
FIG.-4-

SYSTEM, APPARATUS AND METHOD FOR SIM-BASED AUTHENTICATION AND ENCRYPTION IN WIRELESS LOCAL AREA NETWORK ACCESS

FIELD OF THE INVENTION

The present invention generally relates to authentication and encryption mechanisms in Wireless Local Area Network scenarios. More particularly, the invention pertains to means, system and methods for a SIM-based authentication and a layer-2 encryption mechanisms for protecting the communication path from the Terminal Equipment onwards.

BACKGROUND

In 1999, the specification 802.11b was published by the IEEE for Wireless Local Area Network (WLAN) access at rates of 11 Mbps. This standard has become widely supported by the industry and has a huge installed base in enterprise companies, as well as publicly accessible hot spots such as airports, hotels, cafes and so on.

This specification 802.11b offers to some extent authentication and access control mechanisms as well as confidentiality, but only in the wireless path. In this respect, two authentication methods are defined in this standard, namely "Open System" and "Shared Key".

When the Open System is used, a WLAN card in the Terminal Equipment (TE) announces that it wants to associate to a WLAN Access Point (hereinafter abbreviated as AP). No authentication is performed and only some basic access control mechanisms are used like, for instance, Media Access Control (MAC) filters and Service Set Identifiers (SSID).

These MAC filters are arranged for working so that only WLAN cards whose MAC address belongs to a list kept by the AP, such as an Access Control List (ACL), are allowed to associate to the AP. This access control mechanism has a limited utility, since the identity of the entity trying to associate does not actually belong to a user, but rather to the equipment itself. If a terminal or card is stolen, there is no user-based authentication to prevent access to the resources by the stolen equipment. Furthermore, as the MAC addresses of the WLAN card always appear in the headers of the WLAN frames, MAC-address spoofing is a trivial attack. This is of a special relevance since most of the WLAN cards in the market can change its MAC address just by using software means.

The other access control mechanism is the aforementioned Service Set Identifier (SSID), which is an alphanumeric code that identifies the instance of the WLAN that the Terminal Equipment (TE) is trying to associate. A given AP only allows the association of WLAN cards that provide a right SSID. However, as this identifier is usually broadcast by the AP's, and even without changing the default value set by the vendor, this access control mechanism is, again, rather useless since a plurality of well known attacks may occur.

A second authentication method mentioned above is the so-called Shared Key. This procedure is embedded in a basic confidentiality mechanism provided by the Wired Equivalent Privacy (WEP) standard, which is a symmetric encryption algorithm based on RC4. The authentication as such is performed by using a challenge-response mechanism in which both parties, the WLAN card and the AP, show to own a same key. However, this key is installed and stored in the Terminal Equipment (TE), and hence it suffers from the same disadvantages as described when talking about MAC filters.

Moreover, a number of recently published papers have shown the fundamental flaws of the privacy mechanism itself, that is, the flaws of WEP standards. Those flaws begin with the use of static WEP keys, what allows an attacker to find out the keys themselves, since the initialisation vectors of the algorithms are sent in the clear within the WEP frame. A number of passive attacks, like for example a WLAN card that only sniffs the traffic, allow also to deduce the keys.

At the beginning, it seemed that just by refreshing the keys with a better key management, and by increasing their length, for example from 40 to 128 bits, the algorithm could be safer or, at least, safe enough to achieve an acceptable security. However, more and more recent reports have proven that the algorithm design as such cannot provide an acceptable security level.

Nowadays, efforts are made by the industry and representative for a to solve the flaws in the presently applicable standards. The IEEE is currently defining a new standard to improve the authentication mechanisms of the existing 802.11b, and the results may be published as a so-called 802.1x standard, a "Port-Based Network Access Control", but this work is not finished yet. Moreover, this approach only takes into account authentication, so that a proper confidentiality algorithm is still needed. In this respect, current trends suggest that a protocol based in the so-called Advanced Encryption System (AES) protocol may replace WEP. Nevertheless, the port-based authentication mechanism as suggested in 802.1x has a significant impact on the TE operating system and in the AP's applicable software, since 802.1x just seeks a replacement for the authentication mechanism based on WEP, and the WEP itself.

In a short term, a massive adoption of this new standard 802.1x, with the still unresolved flaws above, will lead to new investments in WLAN equipment, since all the AP's of a given WLAN would have to be replaced or, at least, upgraded. Additionally, and somewhat obvious, any WLAN confidentiality mechanism only provides protection on the wireless path, that is, between the WLAN card and the AP. However, the corresponding Ethernet traffic beyond the AP is not encrypted at all.

It is therefore an object at this stage to provide means and methods for allowing an effective authentication mechanism of WLAN users as well as a complete encryption mechanism throughout the whole communication path starting from the Terminal Equipment of said users.

RELATED ART

In short, and as widely described above, the Authentication in currently WLAN applicable standards, namely 802.11, is either non-existent, or device-based when the physical MAC address of the WLAN card is used for authenticating the TE. This is apparently unfeasible for large deployments given that an encryption achieved through the WEP protocol like in WLAN, which is known for its weaknesses, is not found from different sectors appropriate for maintaining an acceptable security.

By way of contrast, authentication in conventional and newer public land mobile networks like GSM, GPRS, or UMTS is done by means of a SIM card and a set of security-proved protocols and algorithms known as "Authentication and Key Agreement" (hereinafter abbreviated as AKA) algorithms. A so-called SIM-based authentication is user-based since a SIM is designed for personal use, and protected by an access PIN.

Nowadays, mobile operators want to extend their offering in access networks by including broadband access, and the WLAN technology makes it possible with access rates up to 11 Mbps, while keeping an extremely low deployment cost, mostly due to the use of unlicensed spectrum band in WLAN. A mobile operator can achieve this by installing their own WLAN or by signing agreements with existing WLAN operators, but in either case, the security requirements should be at least as strong as in the case of a mobile access to the operators core network.

To achieve this, a WLAN operator must offer an authentication and encryption mechanism that implies the possession of a SIM card. This SIM card must be issued by the mobile operator and can be the same SIM used for mobile access, or can be a SIM issued on purpose for WLAN access only.

A conventional WLAN operated by a third party can also have its own local users, and the authentication to be performed for said local is completely up to the WLAN operator. For instance, this authentication for local users might be just based on user identity plus password, or even no security at all. However, for those users that are subscribed to a mobile operator, the authentication and other security issues through said WLAN should be comparable to the ones in the mobile operator's network. On the other hand, a WLAN deployed and operated only by a mobile operator should deny access to users not belonging to that mobile operator, and should only implement authentication mechanisms based on a SIM card.

Nevertheless, any attempt to introduce new and safer mechanisms for authentication and encryption in WLAN must be aimed to produce as less impacts as possible in current WLAN scenarios.

A quite interesting attempt to solve the problems above is described in the US application publication 2002/0009199 with title "Arranging Data Ciphering in a Wireless Telecommunication System". The teaching behind this application also presents a SIM-based authentication scheme.

This SIM-based authentication scheme is, however, intended to derive a ciphering key that is used as the key of the 802.11 native WEP algorithm for traffic encryption between the TE and the AP. The main advantage that this application introduces over the existing WEP capabilities is the addition of a new mechanism for renewing the keys once per session. Apart from that, this application is basically a modified version of the current WEP standards and does not solve the fundamental problems stated above for the original WEP version.

Nevertheless, different sectors in the industry have assessed that well known WEP attacks can guess a WEP key in less than two hours. Obviously, if the WEP key is static and never renewed, as in the original WEP version, the problem is much more significant. Consequently, with the approach presented in US 2002/0009199 the problem is restricted to the limits of the duration of a given session and, if a session expands over few hours, the same problem as before arises. This is clearly insufficient for granting similar security levels to those found in current public land mobile networks.

In this respect, it is an object to achieve a much higher security level allowing the operator to choose an encryption algorithm that better suits their security needs. Notice that there is usually a trade-off between security level and performance. Therefore, additional features like supporting keys with a length of 128, 168, 256 bits, etc.; as well as supporting the latest most secure algorithms, like AES for instance, and a key rotation procedure may be considered another object.

Moreover, in accordance with this application above, US 2002/0009199, the encrypted path goes from the Mobile Terminal to the AP, since WEP is only applicable to the radio path. In this respect, the support for an encryption path to be established beyond the AP, and covering also the wired part of the WLAN, is a further object.

Furthermore, US 2002/0009199 teaches that the assignment of an IP address is done before running the authentication process, and hence, a malicious user can potentially initiate a whole set of well-known attacks. However, if a user has no means to get IP connectivity before having been effectively authenticated, the risk would decrease greatly. Thereby, it is a further object to provide an authentication mechanism for a user to be carried out before giving IP connectivity to said user.

On the other hand, the applications US 2002/012433 and WO 01/76297 disclose, through some common exemplary embodiments, a system where a wireless adapted terminal can connect to a home mobile network through a Wireless IP access network. The home mobile network being responsible for authenticating the user with a SIM-based authentication whereas the Wireless IP access network allowing the user to access to the Internet network once authenticated. The wireless terminal, the Wireless IP access network, and the mobile network all communicated with a mobile IP protocol. The system also comprises a Public Access Controller for controlling access from the radio access network to the Internet services. This Public Access Controller allocates an IP address to the wireless terminal and authenticates the wireless terminal before connection to the Internet is established, and relays authentication messages between the wireless terminal and the home mobile network. Moreover, the interface between wireless terminal and Public Access Controller is an IP based interface, wherein Public Access Controller and wireless terminal are identified by respective IP addresses from each other. The fact that Public Access Controller and wireless terminal make use of an IP-based protocol makes essential that the wireless terminal is assigned an IP address from the very beginning, this IP address sent from the Public Access Controller to the wireless terminal before establishing a secure channel communication. Thereby, the same problem as with the above application, US 2002/0009199, occurs due to the fact that the assignment of an IP address is done before running the authentication process, and hence, a malicious user can potentially initiate a whole set of well known attacks.

In summary, an object is to provide system, means and methods for allowing an effective SIM-based user authentication and for establishing a complete encryption path, starting from the TE, for WLAN users who are subscribers of a public land mobile network. Another object is that this SIM-based user authentication might be performed before giving IP connectivity to said user.

A further object is supporting keys of variable length, the use of security algorithms at operator choice, and providing a key rotation procedure.

A still further object is to achieve the previous objects with a minimum impact on conventional WLAN scenarios.

SUMMARY OF THE INVENTION

The objects are achieved with a method for allowing a SIM-based authentication to users of a wireless local area network who are subscribers of a public land mobile network by means of a data link layer (layer-2) authentication mechanism. An aspect of this method is that the IP connectivity is only provided to the user when the authentication process has been successfully completed.

The objects are thus achieved with a method wherein a wireless terminal finds an accessible Access Point and requests association to the wireless local area network, and the Access Point accepts the request for that. The wireless terminal then initiates the discovering of an Access Controller interposed between the Access Point and the public land mobile network.

Then, the wireless terminal sends the user identifier immediately on top of a Point-to-Point layer 2 protocol toward the Access Controller which shifts the user identifier received on top of a Point-to-Point layer 2 protocol upwards to an authentication protocol residing at application layer.

Following, the Access Controller sends the user identifier toward an Authentication Gateway at the public land mobile network to initiate an authentication procedure.

Once, the authentication process is starting the Access Controller receives an authentication challenge from the public land mobile network via the Authentication Gateway; and shifts the authentication challenge received on the same protocol at application layer downwards on top of the Point-to-Point layer 2 protocol. The authentication challenge is sending by the Access Controller toward the wireless terminal for deriving an authentication response.

Then, the wireless terminal can send the authentication response immediately on top of a Point-to-Point layer 2 protocol toward the Access Controller which shifts the authentication response received on top of a Point-to-Point layer 2 protocol upwards to the authentication protocol at application layer. The authentication response is sending toward the Authentication Gateway from the Access Controller that receives an encryption key from the public land mobile network via the Authentication Gateway.

Following, the Access Controller extracts the encryption key received on the protocol at application layer for further encryption of communication path with the wireless terminal; and the Access Controller sends an assigned IP-address and other network configuration parameters toward the wireless terminal.

This provides the advantages that the mobile terminal adds security authentication mechanism, similar to the ones used in radio communication network, in overall communication path, this means that it obtains confidentiality in wireless path and in wire path. The operators can extend their access networks, offering localized broadband access (11 Mbps) at a very low cost.

Also for accomplishing the objects there is provided an Access Controller that comprises a Point-to-Point server residing at an OSI layer-2 for communicating with the wireless terminal; and an authentication protocol residing at an OSI application layer for communicating with the public land mobile network. Moreover, this Access Controller further comprises means for shifting the information received on top of the Point-to-Point layer-2 protocol upwards to an appropriate authentication protocol residing at application layer. Likewise, the Access Controller also comprises means for shifting the information received on the authentication protocol residing at application layer downwards on top of the Point-to-Point layer 2 protocol.

In order to accomplish the objects, it is also provided a wireless terminal comprising functionality for acting as a Point-to-Point layer 2 protocol client and having an Extensible Authentication Protocol on top of this Point-to-Point layer 2 protocol.

In one aspect, an overall solution results in a telecommunication system comprising a wireless local area network that includes at least one Access Point, a public land mobile network, at least one wireless terminal as above, and the Access Controller above.

BRIEF DESCRIPTION OF DRAWINGS

The features, objects and advantages of the invention will become apparent by reading this description in conjunction with the accompanying drawings, in which:

FIG. 1 represents an embodiment of how a user of a conventional mobile network accessing through a WLAN, which can be accessed by mobile and non-mobile users, may be authenticated by his own mobile network and may have an encrypted path from the TE to his own mobile network.

FIG. 2 presents a simplified architecture compared to the one in FIG. 1, and applicable to a WLAN accessed only by users of a public land mobile network.

FIG. 3 schematically shows an embodiment of an Access Controller comprising a PPPoE Server and a RADIUS Client wherein the Extensible Authentication Protocol resides.

FIG. 4 basically shows an exemplary sequence of actions carried out from the TE to the mobile network and throughout the WLAN entities to perform a SIM-based user authentication.

DETAILED DESCRIPTION OF PREFERRED EMBODIMENTS

The following describes embodiments of means, methods and system for allowing an effective SIM-based user authentication and for establishing a complete encryption path starting from the TE for WLAN users who are subscribers of a public land mobile network. In accordance with an aspect, this SIM-based user authentication is performed before having given IP connectivity to said user.

Therefore, an overall sketch of a preferred embodiment is presented in FIG. 1, showing a general scenario where subscribers of a public land mobile network (GSM/GPRS/UMTS), as well as other local non-mobile users, access a wireless local area network (WLAN). This general scenario in FIG. 1 proposes a particularly simple architecture aimed to minimise the impacts on an existing conventional WLAN in order to accomplish one or more of the stated objects. This rather simple architecture involves different entities from a WLAN and from a public land mobile network, which are described following this. Moreover, FIG. 2 presents an even more simplified architecture in accordance with another embodiment for a WLAN giving access only to subscribers of a public land mobile network and without local WLAN users.

A first entity in FIGS. 1 and 2 is the Terminal Equipment (TE), that is equipped with the necessary hardware and software to interface the user's SIM card as well as to send and receive the required signalling information according to the Authentication and Key Agreement (AKA) protocol. The TE also includes the necessary software to implement a Point-to-Point Protocol over Ethernet (PPPoE) protocol, client side, accordingly with RFC 2516.

The inclusion of such PPPoE client allows the establishment of a Point-to-Point Protocol (PPP) session with a specific server in the WLAN domain. This is a very convenient embodiment in order to leverage on existing authentication mechanisms, for instance the Extensible Authentication Protocol (EAP), and on encryption protocols, like the PPP Encryption Control Protocol (hereinafter referred to as "PPP encrypted") according to RFC 1968, that extends the encryption path along the wired part of the WLAN, thus offering a much higher security level. A component like this PPPoE Client is a core part for the proposed solution.

Other entities in the scenarios in FIGS. 1 and 2 are the Access Points that behave as plain standard radio stations according to the standard 802.11b, without any additional logic. Unlike other possible solutions, as explained in respect of the coming standard 802.1x, the approach offered by the one or more embodiments allows the reuse of the cheap existing hardware instead of having to replace or upgrade all AP's present in the WLAN. These unchanged AP's might run in this scenario with WEP support turned off, since such WEP offers by itself a little security compared to the security mechanisms that are implemented on top of the PPPoE layer.

In accordance with an aspect, there is provided a new entity, the Access Controller (hereinafter referred to as AC) in both FIGS. 1 and 2 that comprises the PPPoE server functionality. This PPPoE server is automatically discovered by the Terminal Equipment (TE), by means of a built-in mechanism in the PPPoE protocol, namely through a handshake initiated by a broadcast message. This Access Controller (AC) also comprises a RADIUS client functionality that has the responsibility of gathering client credentials, received through EAP attributes carried on top of a PPP, and sending them toward a conventional WLAN Authentication Server (WLAN-AS), also through EAP attributes carried now on top of RADIUS messages. A component like this Access Controller (AC) is also a core part for the purpose of the one or more embodiments.

Both the Access Controller and the aforementioned PPPoE client, which is embedded in the Terminal Equipment, are co-operating entities intended for tunneling a challenge-response authentication procedure as well as for establishing an encrypted path.

A further entity present in the most general scenario shown in FIG. 1 is a WLAN-Authentication Server (WLAN-AS) that implements the functionality of a local authenticator server for local WLAN users, not belonging to the mobile operator, and who may be thus authenticated by other means such as a plain user and password matching. This WLAN-AS also plays the role of a RADIUS proxy, when receiving authentication messages from the Access Controller and forwards, them toward an Authentication Gateway (hereinafter referred to as AG) in the public land mobile network operator's domain.

The WLAN-AS functions to authenticate own WLAN users who are not mobile subscribers of the public land mobile network. Consequently, a WLAN intended for giving access only to subscribers of a mobile network may get rid of such entity without affecting the authentication of said mobile subscribers and the establishment of an encrypted path. In this respect, FIG. 2 presents an embodiment of a simplified architecture for a WLAN giving access only to subscribers of a public land mobile network as explained above wherein the WLAN-AS is thus not included.

A still further entity included in the scenarios of FIGS. 1 and 2 is the Authentication Gateway (hereinafter referred to as AG) alone or likely in co-operation with a Home Location Register (HLR) for storing mobile subscribers user data. This Authentication Gateway (AG), alone or in combination with an HLR, act as authentication backend servers inside the operator's domain, and are in charge of generating authentication vectors according to the AKA protocol for conventional and newer public land mobile networks such as GSM, GPRS and UMTS. These components, namely AG and HLR, can be physically separate entities which communicate each other by the Mobile Application Part (MAP) protocol, or they can be a single logical entity acting as a RADIUS server and with the subscriber database built-in, together with the implementation of the necessary algorithms in AKA, such as the well-known A5, A8 and so on. In the latter approach, the communication toward an HLR is, hence, not needed as exemplary illustrated in FIG. 2.

In short, the Access Controller, the aforementioned PPPoE client, which is embedded in the Terminal Equipment, and this Authentication Gateway are the entities included in one or more embodiments. The particular description for the functions residing in such entities is merely illustrative and in non-restrictive manner.

FIG. 3 shows different protocol layers involved in an Access Controller (AC) with reference to the Open System Interconnection (OSI) model. The PPPoE server, residing underneath an IP layer, comprising a PPPoE protocol layer that naturally resides over an Ethernet layer, and having embedded the aforementioned EAP. Likewise, the RADIUS client having a RADIUS protocol layer having embedded the EAP, residing over an UDP layer, both residing over an IP layer.

On the other hand, the manner in which the different elements carry out some aspects of the one or more embodiments is described below with reference to the sequence of actions depicted in FIG. 4.

The aforementioned Terminal Equipment (TE) is equipped with a Mobile Terminal Adapter (MTA) that allows the access to a SIM card carried by a mobile terminal. This TE has a transceiver for communicating (C-401, C-402) with an AP of the WLAN, and includes the appropriate software stack to implement the PPPoE protocol in accordance with the RFC 2516.

The Access Controller (AC) has a PPPoE server embedded. The discovery of the PPPoE server by the PPPoE client is an integral part of the protocol itself (C-403, C-404, C-405, C-406). The identity used by the TE on the PPP link (C-407, C-408) is a Network Access Identifier (NAI), which is entered by the user for establishing required dial-up sessions, and whose realm is used to identify the user as a subscriber of a given mobile operator. No password is needed since the authentication is done by other means. Alternatively, instead of sending a NAI, the IMSI could be fetched from the SIM card and sent as the user identity. This should only be used if sending the IMSI in clear-text is acceptable, which might not be the case.

Having received the user identity with help of EAP mechanisms, the Access Controller (AC) has a RADIUS client for sending (C-409) authentication messages to the WLAN-AS server. The Extensible Authentication Protocol (EAP) is run on top of PPP and RADIUS, in order to carry authentication information between the TE and the AG. The authentication mechanism to be used inside EAP may be the conventional AKA used in public land mobile networks. As already mentioned above, the WLAN-AS acts as an authentication server for regular WLAN users, whose authentication is not SIM-based, and as an authentication proxy for those users whose realm part of the NAI identifies them as subscribers of a mobile network thus using a SIM-based authentication. Then, when acting as an authentication proxy, the WLAN-AS forwards (C-410) the received authentication messages to the Authentication Gateway (AG).

When the Authentication Gateway receives (C-410) an authentication request, asks the HRL for an authentication vector (C-411), triplet or quintet, by using a MAP interface. For this task, the Authentication Gateway (AG) has to know the IMSI of the subscriber whose NAI have been sent in the RADIUS message. This IMSI may be discovered by lookup in a directory database, for instance. The HLR answers back with the requested authentication information (C-412) for the user.

Then, the AG encapsulates the RAND component of the authentication vector in an EAP attribute and sends it back through the WLAN-AS (C-413) toward the AC (C-414) inside a RADIUS message. Notice that for user of newer mobile networks like UMTS, the sending of a message like AUTN might also be required.

The AC then forwards (C-415) the received EAP information to the TE in a PPP message. Notice that the AC behaves here as a "passthrough" of EAP information between "carrier" protocols such as PPP and RADIUS.

When the TE receives the EAP information, extracts the RAND number and uses it to challenge the SIM and generate an answer (RES), that is sent back (C-416, C-417, C-418) to the AG via EAP transmitted over PPP and RADIUS again. As before, for UMTS users the TE first authenticates the network, based on the AUTN. At this stage, it has to be noticed that the TE generates the encryption key following the standard algorithms defined in AKA. This key is used as a seed, namely keying material, to derive one or multiple session keys to be used with the PPP Encryption Control Protocol stated in RFC 1968, and any of the existing PPP encryption algorithms, for instance, the PPP triple-DES encryption protocol, RFC 2420.

The AG receives (C-418) the EAP response and checks the validity of the challenge. The AKA encryption key (Kc) had been received previously in the authentication vector from the HLR likely in co-operation with an Authentication Centre (AuC) not depicted. The AG communicates then the AKA encryption key (Kc) to the AC (C-419, C-420) where the PPPoE server resides. This may be done in an Access-Accept RADIUS message where the EAP-Success is transmitted, but since this EAP command cannot carry any additional data, a RADIUS Vendor Specific Attribute (VSA) may be a more valuable option.

At this stage, the AC receives (C-420) an Access-Accept RADIUS message and requests an IP address from a Dynamic Host Configuration Protocol (DHCP) server, this IP address to be further sent to the TE. The AC follows the same algorithm as the TE to derive session keys from the AKA encryption key (Kc) to be used with the PPP Encryption Control Protocol and the chosen PPP encryption algorithm (3DES, for instance). The AC eventually sends (C-421) the EAP-success message to the TE, together with other configuration parameters destined to said TE, such as an IP address, an IP net mask, DNS servers, and so on. Then, the PPP link is fully established and ready to enter the network phase.

The invention claimed is:

1. A method in a telecommunication system for allowing a SIM-based authentication to users of a wireless local area network who are subscribers of a public land mobile network, the method comprising:
   (a) a wireless terminal accessing the wireless local area network through an accessible Access Point;
   (b) the wireless terminal discovering an Access Controller interposed between the Access Point and the public land mobile network;
   (c) carrying out a challenge-response authentication procedure between the wireless terminal and the public land mobile network through the Access Controller, the wireless terminal provided with a SIM card and adapted for reading data thereof;
   wherein the challenge-response authentication submissions in step (c) take place before having provided an IP connectivity to the user, and are carried:
      on top of a Point-to-Point layer 2 protocol (PPPoE) between the wireless terminal and the Access Controller; and
      on an authentication protocol residing at an application layer between the public land mobile network and the Access Controller; and
   the method further comprising:
   (d) Access Controller offering the IP connectivity to the user at the wireless terminal, by sending an assigned IP address and other network configuration parameters, once said user has been validly authenticated by the public land mobile network.

2. The method in claim 1, wherein the step (b) includes establishing a Point-to-Point Protocol session between a Point-to-Point over Ethernet (PPoE) Protocol client in the wireless terminal and a Point-to-Point over Ethernet (PPoE) Protocol server in the Access Controller.

3. The method in claim 1, wherein the step (c) includes:
   (c1) sending a user identifier from the wireless terminal to the public land mobile network through the Access Controller;
   (c2) receiving an authentication challenge at the wireless terminal from the public land mobile network via the Access Controller;
   (c3) deriving encryption key and authentication response at the wireless terminal from the received authentication challenge;
   (c4) sending the authentication response from the wireless terminal to the public land mobile network through the Access Controller;
   (c5) receiving at the Access Controller an encryption key from the public land mobile network; and
   (c6) extracting the encryption key received for further encryption of communication path with the wireless terminal.

4. The method in claim 2, further comprising the Access Controller shifting authentication information received on top of the Point-to-Point layer 2 protocol upwards to the authentication protocol residing at the application layer for submissions toward the public land mobile network.

5. The method in claim 4, further comprising the Access Controller shifting authentication information received on the authentication protocol residing at the application layer downwards on top of the Point-to-Point layer 2 protocol for submissions toward the wireless terminal.

6. The method in claim 3, further comprising establishing at the wireless terminal a symmetric encryption path by using the previously derived encryption keys at the Access Controller and the wireless terminal.

7. The method in claim 1, wherein the step (d) includes a previous step of the Access Controller requesting the assigned IP address from a Dynamic Host Configuration Protocol server.

8. The method in claim 1, wherein the communication between the Access Controller and the public land mobile network goes through an Authentication Gateway of said public land mobile network.

9. The method in claim 1, wherein the communication between the Access Controller and an Authentication Gateway of the public land mobile network goes through an Authentication Server of the wireless local area network in charge of authenticating local users of said wireless local area network who are not mobile subscribers.

10. The method of claim 3, wherein the user identifier in step (c1) comprises a Network Access Identifier.

11. The method in claim 3, wherein the user identifier in step (c1) comprises an International Mobile Subscriber Identity.

12. The method in claim 1, wherein the authentication protocol residing at the application layer in step (c) is an Extensible Authentication Protocol.

13. The method in claim 12, wherein the Extensible Authentication Protocol is transported over a RADIUS protocol.

14. The method in claim 12, wherein the Extensible Authentication Protocol is transported over a Diameter protocol.

15. An Access Controller in a telecommunication system that comprises a wireless local area network including at least one Access Point, a public land mobile network, and at least one wireless terminal provided with a SIM card and adapted for reading subscriber data thereof, the Access Controller comprising:
- a Point-to-Point layer 2 protocol (PPPoE) server for communicating with the wireless terminal over a PPPoE protocol, the PPPoE server being arranged for tunneling a challenge-response authentication procedure; and
- an authentication client for communicating with the public land mobile network, wherein the authentication client is configured to implement an authentication protocol residing at an application layer,
- wherein the Access Controller is configured to send an assigned IP address and other network configuration parameters to the wireless terminal to provide IP connectivity after the challenge-response authentication procedure is successfully carried out between the wireless terminal and the public land mobile network in the telecommunication system.

16. The Access Controller in claim 15,
- wherein the authentication client is configured to shift information received on top of the Point-to-Point layer 2 protocol upwards to the authentication protocol residing at the application layer; and
- wherein the PPPoE server is configured to shift information received on the authentication protocol residing at the application layer downwards on top of the Point-to-Point layer 2 protocol (PPPoE).

17. The Access Controller in claim 16 wherein the Access Controller is adapted for requesting the assigned IP address from a Dynamic Host Configuration Protocol server, after a user has been successfully authenticated by his public land mobile network.

18. An Access Controller according to claim 17, wherein the Access Controller is adapted for communicating with the wireless terminal via an Access Point.

19. An Access Controller according to claim 17, wherein the Access Controller is adapted for communicating with the public land mobile network via an Authentication Gateway.

20. An Access Controller according to claim 17, wherein the Access Controller is adapted for communicating with an Authentication Gateway via an Authentication Server responsible for authenticating local users of the wireless local area network.

21. An Access Controller according to claim 15, wherein the authentication protocol residing at the application layer is an Extensible Authentication Protocol.

22. The Access Controller in claim 21, wherein the Extensible Authentication Protocol is transported over a RADIUS protocol.

23. The Access Controller in claim 21, wherein the Extensible Authentication Protocol is transported over a Diameter protocol.

24. A telecommunication system comprising:
- a wireless local area network that includes
  - at least one Access Point,
  - a public land mobile network,
  - at least one wireless terminal provided with a SIM card and adapted for reading subscriber data thereof, and
- the Access Controller in claim 15 for allowing SIM-based subscriber authentication to users of the wireless local area network who are subscribers of the public land mobile network.

\* \* \* \* \*

UNITED STATES PATENT AND TRADEMARK OFFICE
CERTIFICATE OF CORRECTION

| | | |
|---|---|---|
| PATENT NO. | : 7,936,710 B2 | Page 1 of 1 |
| APPLICATION NO. | : 10/510498 | |
| DATED | : May 3, 2011 | |
| INVENTOR(S) | : Gregorio Rodriguez et al. | |

It is certified that error appears in the above-identified patent and that said Letters Patent is hereby corrected as shown below:

In Column 2, Line 15, before "to solve the" delete "for a".

Signed and Sealed this
Fourth Day of October, 2011

David J. Kappos
*Director of the United States Patent and Trademark Office*